United States Patent
D'souza (10) Patent No.: US 12,218,963 B2
(45) Date of Patent: Feb. 4, 2025

(54) CYBERSECURITY SYSTEM TO MANAGE SECURITY OF A COMPUTING ENVIRONMENT (CE)

(71) Applicant: Richard D'souza, Langley (CA)

(72) Inventor: Richard D'souza, Langley (CA)

(*) Notice: Subject to any disclaimer, the term of this patent is extended or adjusted under 35 U.S.C. 154(b) by 277 days.

(21) Appl. No.: 17/903,017

(22) Filed: Sep. 5, 2022

(65) Prior Publication Data

US 2023/0007036 A1 Jan. 5, 2023

Related U.S. Application Data

(60) Provisional application No. 63/249,969, filed on Sep. 29, 2021.

(51) Int. Cl.
| | |
|---|---|
| *H04L 29/06* | (2006.01) |
| *G06F 21/32* | (2013.01) |
| *G06F 21/85* | (2013.01) |
| *H04L 9/08* | (2006.01) |
| *H04L 9/30* | (2006.01) |
| *H04L 9/40* | (2022.01) |

(52) U.S. Cl.
CPC .......... *H04L 63/1425* (2013.01); *G06F 21/32* (2013.01); *G06F 21/85* (2013.01); *H04L 9/0819* (2013.01); *H04L 9/0822* (2013.01); *H04L 9/3066* (2013.01); *H04L 63/08* (2013.01); *H04L 63/1416* (2013.01); *H04L 63/1433* (2013.01); *H04L 2463/082* (2013.01)

(58) Field of Classification Search
CPC . H04L 63/1425; H04L 9/0819; H04L 9/0822; H04L 9/3066; H04L 63/08; H04L 63/1416; H04L 63/1433; H04L 2463/082; H04L 63/062; H04L 2463/144; G06F 21/32; G06F 21/85
See application file for complete search history.

(56) References Cited

U.S. PATENT DOCUMENTS

| | | | |
|---|---|---|---|
| 2011/0153811 A1* | 6/2011 | Jeong ..................... | H04L 63/14 709/224 |
| 2016/0028762 A1* | 1/2016 | Di Pietro ............ | H04L 63/1416 726/23 |
| 2019/0356684 A1* | 11/2019 | Sinha .................. | H04L 63/1458 |
| 2020/0228565 A1* | 7/2020 | Reverte .................. | H04L 43/16 |

(Continued)

OTHER PUBLICATIONS

Ghafir, Ibrahim, et al. "Botdet: A system for real time botnet command and control traffic detection." IEEE Access 6 (2018): 38947-38958. (Year: 2018).*

*Primary Examiner* — Ka Shan Choy (74) *Attorney, Agent, or Firm* — RC Trademark Company (57) ABSTRACT

The present invention relates management of security of a computing environment. The method may include; monitoring and learning, through a master computer, a data traffic of the each of the coupled connecting node to alter a security design to speed up the communications; analysing, through the master computer, the data traffic to categorize the each of the coupled connecting node into a first category of node, which is accessed by a human and a second category of node, which is accessed by a bot; utilizing, at the master computer, one or more secured hidden servers for determining a first data communication route to speed up data traffic for the human and a second data communication route to prevent data traffic above a pre-set limit, for the bot.

19 Claims, 2 Drawing Sheets

(56) References Cited

U.S. PATENT DOCUMENTS

| | | | |
|---|---|---|---|
| 2020/0396233 A1* | 12/2020 | Luo | G06N 3/08 |
| 2021/0037048 A1* | 2/2021 | Kurupati | H04L 63/1466 |
| 2022/0116481 A1* | 4/2022 | Katta | H04L 67/02 |

* cited by examiner

CYBERSECURITY SYSTEM TO MANAGE SECURITY OF A COMPUTING ENVIRONMENT (CE)

FIELD OF THE INVENTION

The present invention relates generally to cyber security, more particularly, to a cybersecurity system to manage security of a computing environment (CE).

BACKGROUND

The background description includes information that may be useful in understanding the present invention. It is not an admission that any of the information provided herein is prior art or relevant to the presently claimed invention, or that any publication specifically or implicitly referenced is prior art.

For many years, computer network administrators have placed a high importance on activity detection, both benign and malicious. Users of well-known public and private computer networks utilise gadgets like desktop computers, laptop computers, tablets, smart phones, browsers, etc. to communicate with one another through connected computers and servers. Interconnected network devices send digital data, often in the form of data packets, along the network.

Malicious actions, however, have the potential to harm the network's users, software, or hardware. Unauthorized access to and subsequent unauthorised use of network resources and data are examples of malicious actions. Network administrators look for patterns of behaviour that are abnormal or otherwise deviate from the expected use pattern of a specific entity, such as an organisation or subset thereof, an individual user, an IP address, a node or group of nodes in the network, etc. in order to identify such activities.

In well-known systems, security appliances are utilised to offer network security. The appliance technique is placing security appliances—typically servers or computers outfitted with security measures—at one or more points throughout the network. After being set up, the device keeps track on network traffic. The device may perform a variety of tasks, such as detecting viruses, intrusions, illegal access, and unauthorized usage of data. Unfortunately, scaling security appliances to address transient or long-term increases in network traffic is difficult. An increase in network traffic frequently necessitates an equipment switch or an equally time-consuming appliance upgrade from a security vendor. Because they are often set up to solely monitor data that is travelling the connection on which a particular device is situated, appliances also have a tendency to have a restricted understanding of the network. Such an appliance won't be aware of activities taking place on other network segments that are being watched by other appliances or may come under influence of security breach.

Another method of securing data networks is using installed software solutions as opposed to security hardware appliances. Anti-virus and anti-malware software are examples of such solutions that are often installed on terminal devices (e.g., desktop and laptop computers, tablets, or smart phones). The installed products keep track of data traveling over the network between the terminal device to look for malware in either inbound or outbound data. Unfortunately, the scalability and network visibility of deployed software solutions are likewise subpar. Installed products typically have rather confined views of the data on the network because they are placed locally on the terminal devices. Additionally, they frequently come pre-installed on hardware that is difficult to change.

Various technological solutions (e.g., digital information infrastructure and method for security designated data and with granular data stores, system, method, and apparatus for providing network security, etc.) are disclosed in patent literature. However, the technological solutions for managing security of a computing environment suffer from various limitations such as inaccuracy in detection of malware, lack of efficient mechanism to combat the detected malware, etc. Thus, there remains a need for further contributions in this area of technology. More specifically, a need exists in the area of technology to manage security of a computing environment.

All references, including publications, patent applications, and patents, cited herein are hereby incorporated by reference to the same extent as if each reference were individually and specifically indicated to be incorporated by reference and were set forth in its entirety herein.

SUMMARY

The present invention relates generally to cyber security, more particularly, to a cybersecurity system to manage security of a computing environment (CE).

Various objects, features, and advantages of the disclosed subject matter can be more fully appreciated with reference to the following detailed description of the disclosed subject matter when considered in connection with the following drawings, in which like reference numerals identify like elements.

The following paragraphs provide additional support for the claims of the subject application.

In an aspect the present disclosure provides a cybersecurity system to manage security of a computing environment (CE), the system comprising: the CE comprising: a master computer, and the multiple connecting nodes, wherein the each of the connecting nodes are communicably coupled with the master computer, wherein the master computer is arranged to: monitor and learn a data traffic of the each of the coupled connecting node to alter a security design to speed up the communications; analyse the data traffic to categorize the each of the coupled connecting node into: a first category of node, which is accessed by a human; and a second category of node, which is accessed by a bot; and utilize of one or more secured hidden servers to determine: a first data communication route to speed up data traffic for the human; and a second data communication route to prevent data traffic above a pre-set limit, for the bot.

In another aspect the present disclosure provides a method for managing security of a computing environment (CE), the method comprising: utilizing the multiple connecting nodes which are communicably coupled with a master computer, wherein the master computer enables: monitoring and learning a data traffic of the each of the coupled connecting node to alter a security design to speed up the communications; analysing the data traffic to categorize the each of the coupled connecting node into: a first category of node, which is accessed by a human; and a second category of node, which is accessed by a bot; and utilizing one or more secured hidden servers for determining: a first data communication route to speed up data traffic for the human; and a second data communication route to prevent data traffic above a pre-set limit, for the bot.

In an embodiment, the learning is performed by utilizing a machine learning technique, wherein the machine learning technique and keys discovery history enables an Elliptic-curve cryptography (ECC) AI to control ECC key generation Engine to randomly generate a key.

In an embodiment, the master computer categorizes the bots as the good bots and the bad bots based on the analysis of the data traffic.

In an embodiment, the good bots are selected from the search engine crawlers, the commercial crawlers, the feed fetcher bots, and the monitoring bots.

In an embodiment, the bad bots are selected from the account takeover bots, the carding and card cracking bots, the spamming bots and the scraping bots.

In an embodiment, the master computer determines an internet protocol (IP) address of the coupled connecting nodes accessed by the bad bots.

In an embodiment, the master computer transmits an alert to the coupled connecting nodes when the IP address is identified, the alert comprising one or more of the following: a visual alert, a sound alert, a text alert, and an email alert.

In an embodiment, the master computer blocks an access of the CE for the coupled connecting nodes based on the determined IP address.

In an embodiment, the master computer enables a data retention mechanism to prevent a loss of data from the coupled connecting nodes.

BRIEF DESCRIPTION OF THE DRAWINGS

The features and advantages of the present disclosure would be more clearly understood from the following description taken in conjunction with the accompanying drawings in which.

DETAILED DESCRIPTION

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

Following below are more detailed descriptions of various concepts related to, and implementations of, methods, apparatuses, and systems of determining a credibility status of an image a person. The various concepts introduced above and discussed in greater detail below may be implemented in any of numerous ways.

The detailed description is described with reference to the accompanying figures. In the figures, the left-most digit(s) of a reference number identifies the figure in which the reference number first appears. The use of the same reference numbers in different instances in the description and the figures may indicate similar or identical items.

The present invention relates generally to cyber security, more particularly, to a cybersecurity system to manage security of a computing environment (CE).

Referring now to a cybersecurity system to manage security of a computing environment (CE) and components/ elements thereof, in accordance to embodiment of present disclosure. Referring now to the invention in more detail, in FIG. 1 there is shown, the CE 102 comprising multiple connecting nodes 104-A1, 104-A2, 104-A3, . . . , 104-AN (hereinafter "collectively" or "individually" referred as connecting nodes 104-A, coupled connecting nodes 104-A or connecting node 104-A), a master computer 106 and other known components of a computer network.

Figure 1:
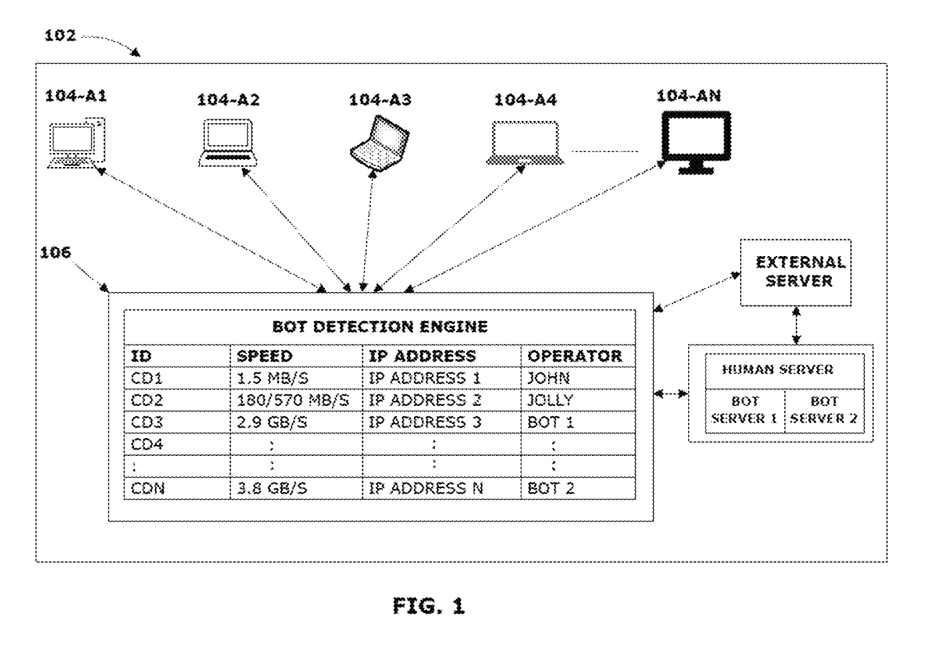
FIG. 1 illustrates a cybersecurity system to manage security of a computing environment (CE) and components/ elements thereof, in accordance to embodiment of present disclosure.

In an embodiment, the CE 102 can be a configuration of numerous connecting nodes 104-A used to address a challenge. The CE 102 can be used to assess a software product's degree of networked, collaborative, or multi-user environment functionality. The CE 102 can comprise computing mainframes, servers, workstations, data storage devices, plotters, operating systems, and other application software, such as database management systems, etc. For the CE 102 to operate effectively and securely, the connecting nodes 104-A, the master computer 106, and other well-known computing environment components may be added.

In an embodiment, the connecting nodes 104-A can be arranged to communicate with each other within the CE 102, which can also be referred as a virtual private network (VPN). The each connecting node 104-A may communicate with one or more instances or servers outside the VPN. Each of the connecting node 104-A can be monitored by the master computer 106, which may analyse an inbound traffic and outbound traffic to/from each of the connecting node 104-A, for managing the security of the CE 102. The connecting nodes 104-A can be selected from a desktop computer, a laptop, a tablet phone, a mobile phone, etc.

In an embodiment, the master computer 106 can be arranged to monitor and learn a data traffic to/from each of the connecting node 104-A within the CE 102 to alter a security design to speed up the communications. The master computer 106 may analyse the data traffic to categorize the each of the connecting node 104-A into a first category of node and a second category of node. The first category of node can be assumed to be accessed by a human, wherein the first category of node may receive an input in a first pre-defined duration of time (i.e., time interval between timestamps of the current request and the preceding one) or nature of browse mode (e.g., manual or automatic) or lower frequency of data communication or lower Volume of data in the HTTP response or data access without use of proxy- server or data access from a registered IP address and many more. The second category of node can be assumed to be accessed by a bot (i.e., requested resource is a script/ program file), wherein the second category of node may receive the input in a second pre-defined duration of time. The first pre-defined duration of time can be greater than the second pre-defined duration of time, because the humans may can be less responsive than the bots. Bots, often referred to as web robots, WWW robots, or internet robots, can be software programmes that may automate or schedule the completion of repetitive tasks online that would be too boring or time-consuming for a human to accomplish. Bots can be used by search engines to browse the web and carefully categories content from websites, by trading sites to quickly find the best deals, and by some websites and services to give critical information like weather, news, and exchange rates. In an embodiment, the master computer 106 may deploy a dedicated bot detection engine/functionality, that can be configured to receive traffic data from (master computer 106) each of connecting node 104-A of CE 102 and/or between connecting node 104-A. In some embodiments, the bot detection engine may perform a pre-processing step to discard datasets. The bot detection engine may analyse traffic data such as requesting a website or request data access (e.g., click next page button, click on image to enlarge) or data entry (e.g., selection of radio button, search query etc.), or change in web setting (e.g., change in volume level, change in resolution, enable/disable auto play etc.) or change in appearance of web content (e.g., change in theme colour, default setting etc.), or interaction with web pop-up (e.g., accept or reject cookies access etc.) and many more activity. The bot detection engine may deploy bot detection technique such as KL/PCA/clustering analysis module, behaviour analysis module, machine learning analysis module or other existing classifiers to classify the all connecting nodes 104-A into either first category or second category. Alternatively, the bot detection engine may compare IP address of each of connecting nodes 104-A against a list of IP address of bots, to enable categorization into first or second category. Furthermore, the bot detection engine may utilize Captcha (Completely Automated Public Turing test to tell Computers and Humans Apart) or any other known challenge-response testing protocol to categorize computing node 104-A into first or second category (i.e., bot). The term "bot" can be referred to an automated process that may interact with network elements (e.g., server) without human intervention. Bots may be configured to automate tasks that would otherwise be conducted by a human being.

The master computer 106 may utilize of one or more secured hidden servers (e.g., depicted as external server) to determine a first data communication route (e.g., source of data, other data gateway) to speed up or optimize data traffic for the human and a second data communication route to prevent data traffic above a pre-set limit, for the bot. For example, master computer 106 may be configured to partition the network into multiple subnets for management, performance, resource allocation, and other purposes. The bot driven connecting nodes 104-A and human operated connecting nodes 104-A can be assigned to differ subnet to optimize performance of CE 102. For example, the master computer 106 may alter (increase) a network bandwidth (of the CE 102) for the first category of node, which can be accessed by humans, thereby speeding up the network speed. Similarly, the master computer 106 may limit or reduce the network bandwidth for the second category of node, which can be accessed by the bots, thereby prevent data traffic above the pre-set limit.

As illustrated, the master computer 106 can continuously record inbound traffic and outbound traffic for each of connecting nodes 104-A1, connecting nodes 104-A2, connecting nodes 104-A3, connecting nodes 104-A4 . . . connecting nodes 104-An. The bot detection engine can access historical traffic database, which comprises multiple traffic data-points, wherein the each of data-point is tagged with nature of user (e.g., bot or human user). The bot detection engine can deploy machine learning techniques (e.g., deep learning, artificial inelegance, SVM etc.) to generate one or more pattern detection models. The bot detection engine may split historical traffic database into a training set (~70-75%) and a test set (~25-30%). The training set may be deployed to develop one or more pattern detection models to classify connecting nodes 104-A into bot (i.e., second category) or human user (i.e., first user). The test set would be used to determine exactitude (e.g., lower false positive, higher classification rate etc.) of each generated pattern detection models. Based on the exactitude details, a best prediction model can be selected. The best prediction model can used by the bot detection engine to categorize the each connecting nodes 104-A into first or second category.

In an embodiment, the learning can be performed by utilizing a machine learning technique, wherein the machine learning technique and keys discovery history enables an Elliptic-curve cryptography (ECC) AI to control ECC key generation engine to randomly generate a key, wherein ECC focuses on generation of pairs of public and private keys for decryption and encryption of web traffic by utilizing mathematics of elliptic curves. Since, ECC bases its approach to public key cryptographic systems on how elliptic curves are structured algebraically over finite fields, therefore, ECC creates keys that are more difficult, mathematically, to crack. The ECC possess smaller key size, thereby making obvious choice for use. ECC has smaller ciphertexts, keys, and signatures, as well as faster key and signature generation. ECC decrypts and encrypts data at a reasonably quick rate. Due to the two-stage computation of signatures used by ECC, overall latency is lower than the inverse. ECC has robust protocols for authenticated key exchange, and the technology is well supported.

In an embodiment, the master computer 106 may categorize the bots as the good bots and the bad bots based on the analysis of the data traffic coming towards the connecting nodes 104-A. For further sub-categorization of the second category of connecting nodes 104-A into bad bot and bad bot, the bot detection engine may tweak the best prediction model by modifying weight to one or more such as origin (e.g., IP address), nature of data access (e.g., video, image, text), nature of webpage (e.g., news article, personal data access, etc.), security of data (e.g., password protected), amount of data access (e.g., 10-100 Mbs, 1-1.5 Gb), frequency of data access (e.g., data traffic) and any other parameters. The tweaked predication model can be used to categorize each of the connecting nodes 104-A of second category as the good bots and the bad bots. The good bots did not hamper data, breach security and assist the owner to perform task which would require multiple manual data entry or improve work efficiency and many more. Exemplary good bot can be customer care bot to provide 24/7 client service, chat bot to respond to user and customer questions swiftly at any hour of the day, depending on their degree of training. The bad bot can be created with malice intent such as can set up fictitious social media accounts to bombard customers and businesses with unfavourable or inappropriate remarks, or even to propagate false information, infect complete of part of CE 102, theft personal data (e.g., password, finical account details), slower functionality of CE 102 and many more.

In an embodiment, the good bots can be selected from the search engine crawlers, the commercial crawlers, the feed fetcher bots, and the monitoring bots, which could enhance the abilities of the websites. These bots can be used by search engines to crawl websites, check links, retrieve contend and update their indices. The good bots may ultimately optimize the contents of the websites, without human intervention at a rapid pace.

In an embodiment, the bad bots can be selected from the account takeover bots, the carding and card cracking bots, the spamming bots and the scraping bots, which may harm the personal identifiable information (PII) of the users and may also harm the server of the websites (e.g., illegally scraping your website content and republishing it Sending nuisance mails or spam mails). The account takeover bots may take over a user account without permission from the account owner. When an account is compromised by the bad bots, the account can be abused in a range of ways to extract confidential business or user data, commit financial crime and fraud, spread disinformation, and carry out other nefarious activities. In the carding and card cracking bot attacks, cybercriminals may leverage the firepower of credit card bots to test stolen card data against payment processes to identify valid card details or missing values of stolen payment card information in order to commit carding fraud. The spam bot, or spambot, can be a computer application that spammers employ to send vast quantities of spam messages automatically. The program can be simple, and it usually relies on a list of email addresses collected via email harvesting or scraping.

In an embodiment, the master computer 106 may determine an internet protocol (IP) address of the coupled connecting nodes 104-A accessed by the bad bots, so that the indulgence of the bad bots can be minimized or eliminated within the CE 102. The master computer 106 may activate flow logs to identify the IP address of the affected coupled connecting nodes 104-A.

In an embodiment, the master computer 106 can transmit an alert to a system administrator to notify status (e.g., number of bot, nature of bot such as good bot, bad bot) connected bot and details about the coupled connecting nodes 104-A, the alert comprising one or more of the following: a visual alert, a sound alert, a text alert, and an email alert. The master computing node 106 may configure a notification service, which may transmit alert to the coupled connecting nodes 104-A or any other computing device. The notification service may coordinate and manage the delivery of push messages/mails/notifications to coupled connecting nodes 104-A, based on the identified IP address.

In an embodiment, the master computer 106 may block access of the CE 102 for the coupled connecting nodes 104-A based on the determined IP address, wherein the coupled connecting nodes 104-A can be affected by the bad bots. The master computing node 106 may append the IP address of the coupled connecting nodes 104-A (affected by the bad bots) in a network access control list (NACL), thereby blocking the inbound and outbound traffic to/from the coupled connecting nodes 104-A. The master computer 106 may deactivate an internet gateway associated with the coupled connecting nodes 104-A for the intended isolation or blockage of access. The term "inbound traffic" from master computer 106 can be resulted on internal action (of connecting nodes 104-A), such as allowing the entity to log in or run a service or program, or accepting data, storing a file and many more. Term "outbound traffic" is traffic in which the master computer 106 transmit data to connecting nodes 104-A or an external entity.

In an embodiment the master computer 106 may enable a data retention mechanism to prevent a loss of data from the coupled connecting nodes 104-A, thereby increasing the availability and durability of the data stored within the coupled connecting nodes 104-A. The master computer 106 may enable backup by creating a replica or taking a snapshot of the data. The created replica or snapshot can be transmitted to a cloud-based storage, from where the stored data may be restored at any instance at the coupled connecting nodes 104-A.

In an aspect, the coupled connecting nodes 104-A may be equipped with web application firewall that filters, monitors, and blocks HTTP traffic to and from a web service, thereby providing an initial level of security to each of the connecting nodes 104-A and ultimately to the CE 102.

In an aspect, the known cybersecurity mechanisms may utilize conventional prospective of blocking data communication with the affected computing nodes (hacked or infected by bots) with other computing nodes, which are not still affected. The known cybersecurity mechanisms block the access of a particular web service, which may utilize bots. The present disclosure provides a secure CE 102 for efficient working of master computer 106 as well as connecting nodes 104-A. The present disclosure also manages the data communication speed based on the detected category of access. For example, the connecting nodes 104-A being accessed by humans may transfer and receive data traffic at a greater pace, as compared to the connecting nodes being accessed by bots. The present disclosure, improves data traffic within CE 102.

Figure 2:
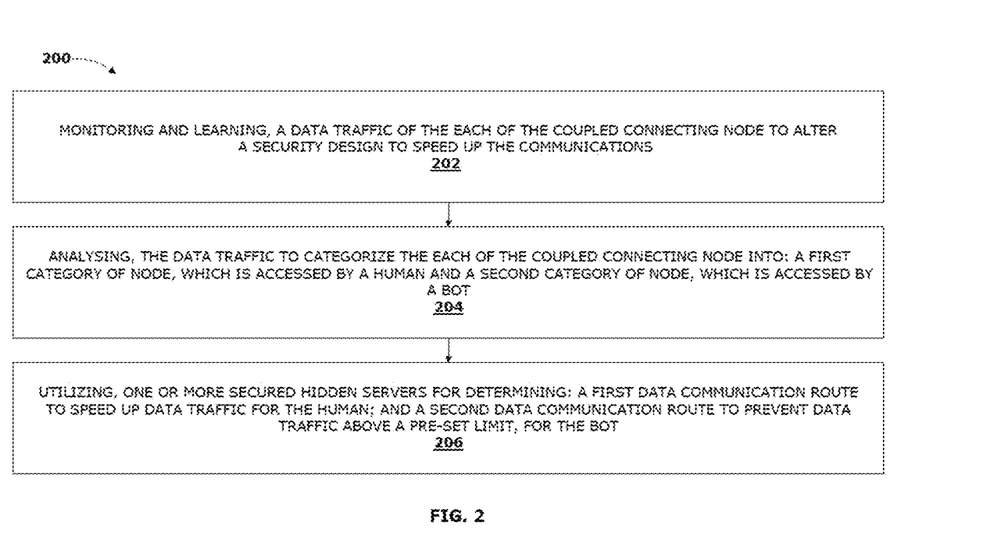
FIG. 2 illustrate exemplarily steps to manage security of a computing environment (CE), in accordance with embodiments of the present disclosure.

FIG. 2 illustrate exemplarily steps to manage security of a computing environment (CE), in accordance with embodiments of the present disclosure. As illustrated in flow diagram 200, the method may include steps of: at step (202) monitoring and learning, through a master computer 106, a data traffic (e.g., outbound traffic or inbound traffic) of the each of the coupled connecting node 104-A to alter a security design to speed up the communications; at step (204) analysing, through the master computer 106, the data traffic to categorize the each of the coupled connecting node 104-A into a first category of node, which is accessed by a human and a second category of node, which is accessed by a bot; at step (206) utilizing, at the master computer 106, one or more secured hidden servers for determining a first data communication route to speed up data traffic for the human and a second data communication route to prevent data traffic above a pre-set limit, for the bot. For example, the bot operated connecting nodes 104-A (e.g., CN4 and CDN of FIG. 1) can access data through bot server (e.g., Bot server 1 and Bot Server 2), which would have limited or lower bandwidth than the high-speed server (e.g., Human server of FIG. 1). Further, cloud server may further, differentiate bot as good bot and bad bot. The further segregation of bot operated nodes may further improve data communication speed of CE 102. The bad bot may be routed to very low speed server (e.g., Bot server 2), which provide limited data access at lower bandwidth than the good bot, which may be connected with intermediate server (e.g., bot server 1).

Figure 3:
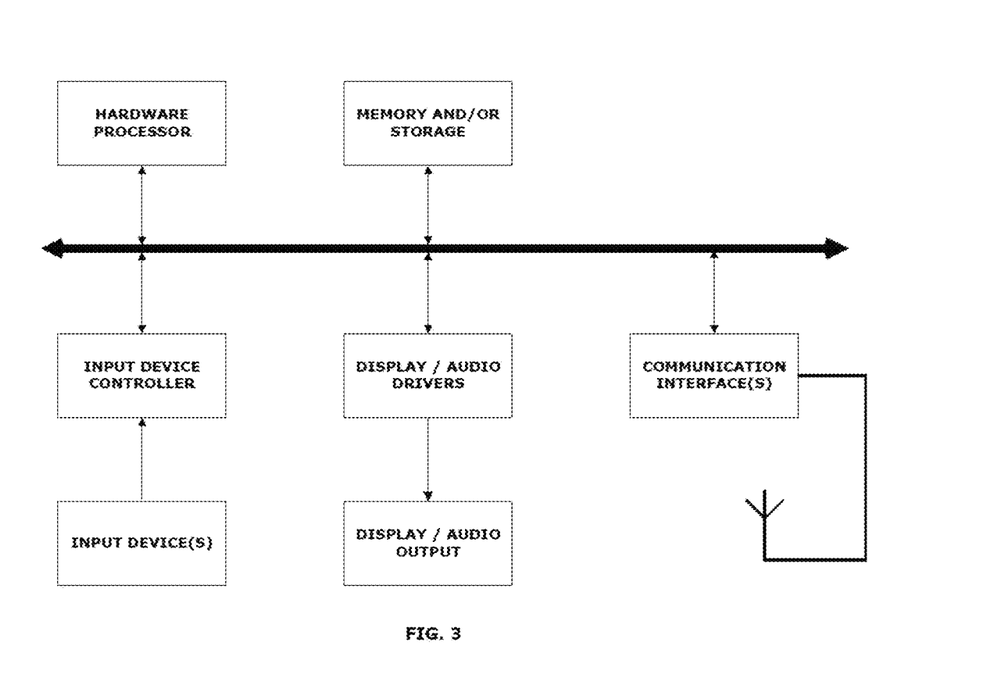
FIG. 3 illustrate exemplarily hardware to be used in one or more secure hidden servers and/or master computer and each of the coupled connecting node to manage security of a computing environment (CE) 102, in accordance with embodiments of the present disclosure.

FIG. 3 illustrate exemplarily hardware to be used in one or more secure hidden servers and/or master computer and each of the coupled connecting node to manage security of a computing environment (CE) 102, in accordance with embodiments of the present disclosure. As illustrated, the any computing device/entity of connecting node 104-A or master computer 106 can include any suitable hardware processor, memory and/or storage, an input device controller, an input device, display/audio drivers, display and audio output circuitry, communication interface(s), an antenna, and a bus.

The hardware processor can include s a microprocessor, a micro-controller, digital signal processor(s), dedicated logic, and/or any other suitable circuitry for performing various required tasks. c. In some embodiments, hardware processor can be arranged to execute server program or firmware that can be stored in memory and/or storage of a server (e.g., secure hidden servers).

The memory and/or storage can be any suitable memory and/or storage for storing programs, data, media content, and/or any other suitable information in some implementations. For example, memory and/or storage can include random access memory, read-only memory, flash memory, hard disk storage, optical media, and/or any other suitable memory.

Input device controller can be any suitable circuitry for controlling and receiving input from one or more input devices in some implementations. For example, input device controller can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers can be any suitable circuitry for controlling and driving output to one or more display/audio output devices in some implementations. For example, display/audio drivers can be circuitry for driving a touchscreen, a flat-panel display, a cathode ray tube display, a projector, a speaker or speakers, and/or any other suitable display and/or presentation devices.

Communication interface(s) can be any suitable circuitry for interfacing with one or more communication networks (e.g., WIFI, Bluetooth, telecommunication network etc.). For example, interface(s) can include network interface card circuitry, wireless communication circuitry, and/or any other suitable type of communication network circuitry.

Antenna can be any suitable one or more antennas for wirelessly communicating with a communication network in some implementations. In some implementations, antenna can be omitted.

Bus can be any suitable mechanism for communicating between two or more aforementioned components such as an input device, display/audio drivers, display and audio output circuitry, communication interface(s), an antenna.

Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

As used herein, the term "wireless communication network" or "network interface" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between network devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth, depending on the applied terminology and technology. The "network device" or "terminal device" or "computing device" may represent any suitable device (or group of devices) capable, configured, arranged, and/or operable to enable and/or provide a terminal device access to the wireless communication network or to provide some service to a terminal device that has accessed the wireless communication network. The terminal device may include, but not limited to, a mobile phone, a cellular phone, a smart phone, a tablet, a wearable device, a personal digital assistant (PDA), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment", "computing device", "network device" and "UE" may be used interchangeably.

Processing device may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

All references to "a/an/the element, apparatus, component, means, step, etc." are to be interpreted as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

The wordings such as "include", "including", "comprise" and "comprising" do not exclude elements or steps which are present but not listed in the description and the claims.

It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

I claim:

1. A cybersecurity system to manage security of a computing environment (CE), the system comprising:
   the CE comprising:
      a master computer, and
      the multiple connecting nodes, wherein the each of the connecting nodes are communicably coupled with the master computer, wherein the master computer is arranged to:
         monitor and learn a data traffic of the each of the coupled connecting node to alter a security design to speed up the communications;
         analyse the data traffic to categorize the each of the coupled connecting node into:
            a first category of node, which is accessed by a human; and
            a second category of node, which is accessed by a bot; and
         utilize of one or more secured hidden servers to determine:
            a first data communication route to speed up data traffic for the human; and
            a second data communication route to prevent data traffic above a pre-set limit, for the bot.

2. The system as claimed in claim 1, wherein the learning is performed by utilizing a machine learning technique, wherein the machine learning technique and keys discovery history enables an Elliptic-curve cryptography (ECC) artificial intelligence ("AI") to control ECC key generation Engine to randomly generate a key.

3. The system as claimed in claim 1, wherein the master computer categorizes the bots as the good bots and the bad bots based on the analysis of the data traffic.

4. The system as claimed in claim 3, wherein the good bots are selected from the search engine crawlers, the commercial crawlers, the feed fetcher bots, and the monitoring bots.

5. The system as claimed in claim 3, wherein the bad bots are selected from the account takeover bots, the carding and card cracking bots, the spamming bots and the scraping bots.

6. The system as claimed in claim 3, wherein the master computer determines an internet protocol (IP) address of the coupled connecting nodes accessed by the bad bots.

7. The system as claimed in claim 6, wherein the master computer transmits an alert to the coupled connecting nodes when the IP address is identified, the alert comprising one or more of the following: a visual alert, a sound alert, a text alert, and an email alert.

8. The system as claimed in claim 6, wherein the master computer blocks an access of the CE for the coupled connecting nodes based on the determined IP address.

9. The system as claimed in claim 1, the master computer enables a data retention mechanism to prevent a loss of data from the coupled connecting nodes.

10. A method for managing security of a computing environment (CE), the method comprising:
    utilizing the multiple connecting nodes which are communicably coupled with a master computer, wherein the master computer enables:
       monitoring and learning a data traffic of the each of the coupled connecting node to alter a security design to speed up the communications;
       analysing the data traffic to categorize the each of the coupled connecting node into:
          a first category of node, which is accessed by a human; and
          a second category of node, which is accessed by a bot; and
       utilizing one or more secured hidden servers for determining:
          a first data communication route to speed up data traffic for the human; and
          a second data communication route to prevent data traffic above a pre-set limit, for the bot.

11. The method as claimed in claim 10, wherein learning is performed by utilizing a machine learning, wherein the machine learning and keys discovery history enable an Elliptic-curve cryptography (ECC) artificial intelligence ("AI") to control ECC key generation Engine to randomly generate a key.

12. The method as claimed in claim 10, wherein the master computer categorizes the bots as the good bots and the bad bots based on the analysis of the data traffic.

13. The method as claimed in claim 12, wherein the good bots are selected from the search engine crawlers, the commercial crawlers, the feed fetcher bots, and the monitoring bots.

14. The method as claimed in claim 12, wherein the bad bots are selected from the account takeover bots, the carding and card cracking bots, the spamming bots and the scraping bots.

15. The method as claimed in claim 12, wherein the master computer determines an internet protocol (IP) address of the coupled connecting nodes accessed by the bad bots.

16. The method as claimed in claim 15, wherein the master computer transmits an alert to the coupled connecting nodes when the IP address is identified, the alert comprising one or more of the following: a visual alert, a sound alert, a text alert, and an email alert.

17. The method as claimed in claim 15, wherein the master computer blocks an access of the CE for the coupled connecting nodes based on the determined IP address.

18. The method as claimed in claim 10, the master computer enables a data retention mechanism to prevent a loss of data from the coupled connecting nodes.

19. A non-transitory computer-readable storage medium, comprising executable instructions that, when executed by a processing system including a processor, facilitate security management, comprising:
   utilizing the multiple connecting nodes which are communicably coupled with a master computer, wherein the master computer enables:
      monitoring and learning a data traffic of the each of the coupled connecting node to alter a security design to speed up the communications;
      analysing the data traffic to categorize the each of the coupled connecting node into:
         a first category of node, which is accessed by a human; and
         a second category of node, which is accessed by a bot; and
      utilizing one or more secured hidden servers for determining:
         a first data communication route to speed up data traffic for the human; and
         a second data communication route to prevent data traffic above a pre-set limit, for the bot.

* * * * *